United States Patent
Schweitz

(10) Patent No.: US 7,322,477 B2
(45) Date of Patent: Jan. 29, 2008

(54) MODULAR RACQUET AND GEAR TOTE BAG DEVICE

(76) Inventor: Josh Schweitz, 405 NW. Upton Ter. #3B, Portland, OR (US) 97210

( * ) Notice: Subject to any disclaimer, the term of this patent is extended or adjusted under 35 U.S.C. 154(b) by 31 days.

(21) Appl. No.: 11/215,861

(22) Filed: Aug. 30, 2005

(65) Prior Publication Data

US 2007/0045138 A1 Mar. 1, 2007

(51) Int. Cl.
*B65D 69/00* (2006.01)
*A45C 3/00* (2006.01)

(52) U.S. Cl. .............. 206/579; 206/315.1; 150/111; 190/108; 220/23.4

(58) Field of Classification Search ............ 206/315.1, 206/315.9, 523, 579; 150/106, 111; 190/108; 220/23.4, 23.8, 23.83, 23.86; 224/581, 582
See application file for complete search history.

(56) References Cited

U.S. PATENT DOCUMENTS

| | | | | | |
|---|---|---|---|---|---|
| 4,795,030 | A | * | 1/1989 | Boyce | 190/108 |
| 5,005,679 | A | * | 4/1991 | Hjelle | 150/106 |
| 5,186,290 | A | * | 2/1993 | Takayama | 190/108 |
| 5,219,423 | A | * | 6/1993 | Kamaya | 190/108 |
| 6,213,267 | B1 | * | 4/2001 | Miller | 190/108 |
| 2002/0104725 | A1 | * | 8/2002 | Dexheimer | 190/108 |
| 2004/0206655 | A1 | * | 10/2004 | Bennett | 206/503 |
| 2004/0222059 | A1 | * | 11/2004 | Glankler | 190/108 |

* cited by examiner

*Primary Examiner*—Luan K Bui
(74) *Attorney, Agent, or Firm*—Ater Wynne, LLP

(57) ABSTRACT

The invented modular, capacity-adjustable racquet tote bag device includes two or more individual container segments each configured to contain at least a head portion of a racquet and associated gear, each segment being substantially coextensive and congruent in dimension and shape on at least one face with another; cooperative fastening means extending at least part-way circumferentially around confronting ones of the faces, the fastening means configured to securely join the two or more individual container segments together; and tote means, e.g. a handle or a shoulder strap, associated with at least one of the segments for transporting the racquet tote bag device. Preferably, the cooperative fastening means includes one or more confronting loop and pile textile members configured to detachably affix to one another when pressed together. Coding means involving one or more of color differentiation, pattern differentiation, graphic differentiation, text differentiation and fabric texture differentiation provide visually distinct and thus identifiable container segments. One or more pockets configured to contain gear are also provided either within or outside each container segment.

14 Claims, 3 Drawing Sheets

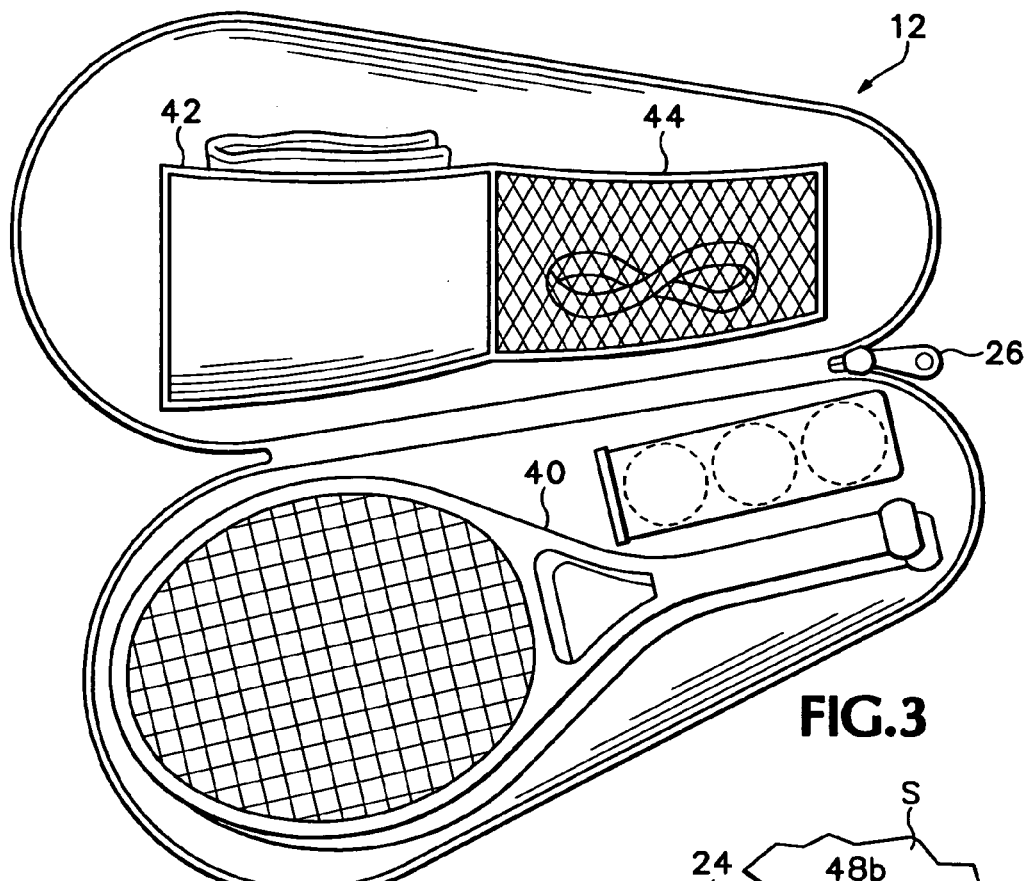
FIG.3
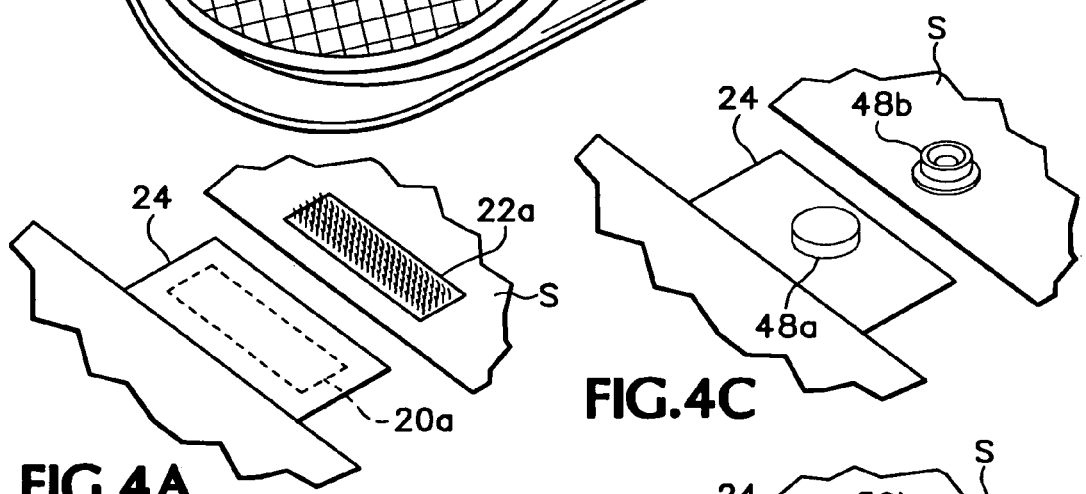
FIG.4A
FIG.4C
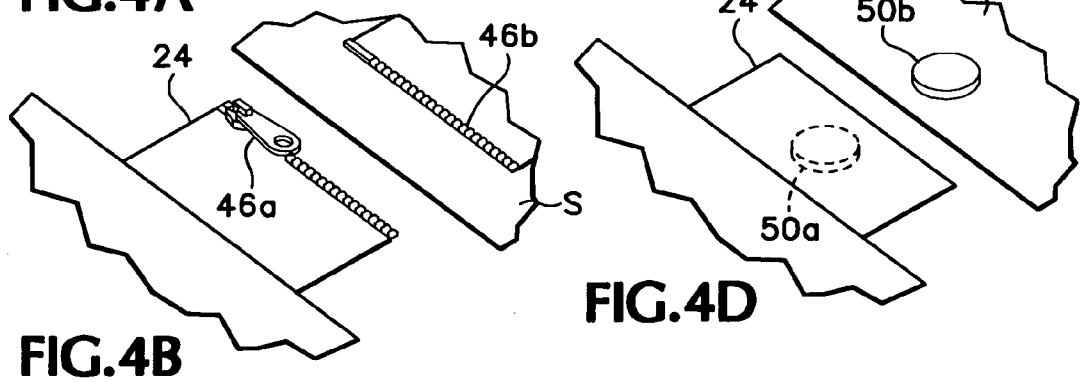
FIG.4B
FIG.4D

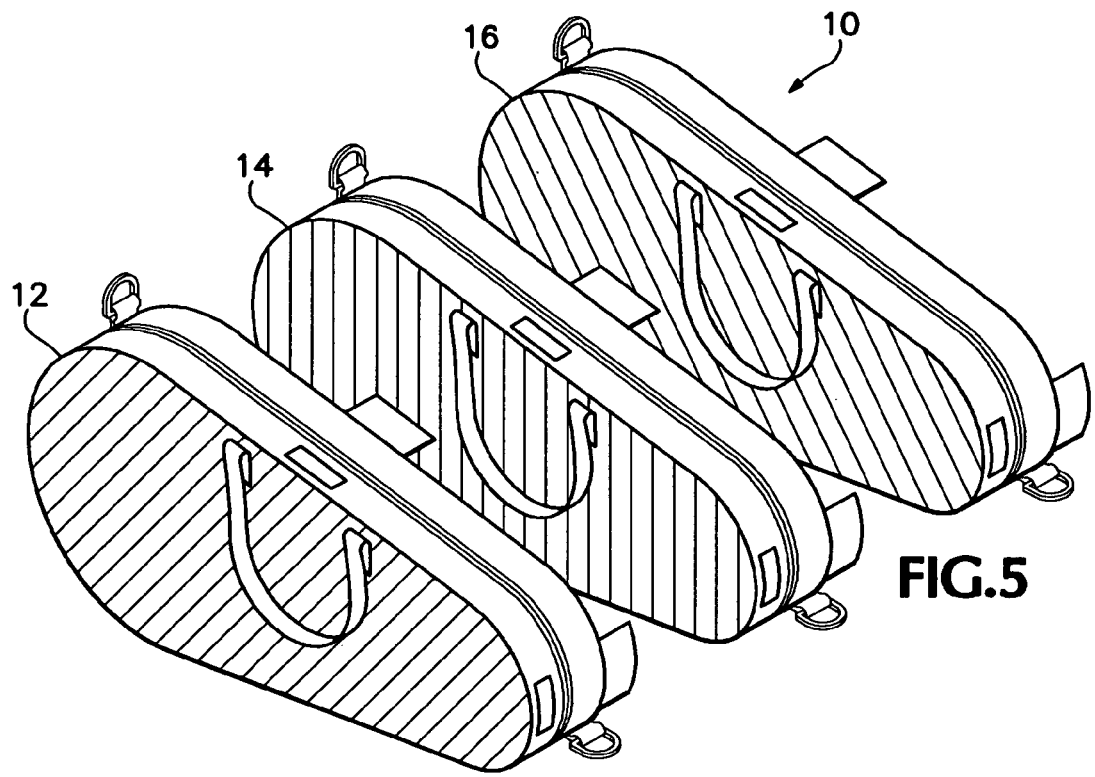
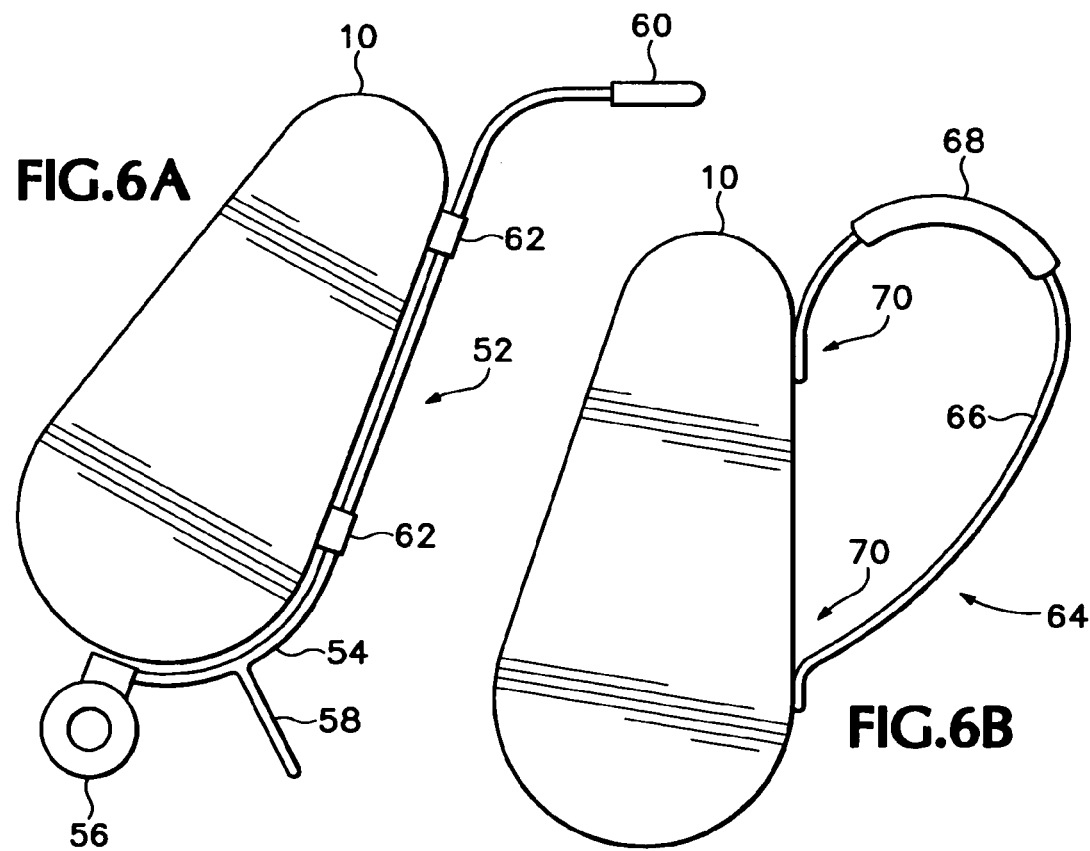

MODULAR RACQUET AND GEAR TOTE BAG DEVICE

BACKGROUND OF THE INVENTION

This invention relates generally to the field of tote bags for racquets such as tennis racquets. More particularly, it involves bags that are specially configured for carrying one or more racquets and associated gear while traveling to and from practice or a tournament.

Professional tennis players, for example, nearly always carry more than one racquet to and from practice or a tournament. Often, nearly half a dozen racquets are carried at one time to ensure that play is uninterrupted by a broken string or loss of tension or frame damage or bad handle wrap or any other thing that can impact competitiveness. Preparing for such travel, a tennis player must sort through the mixed bag of racquets to ensure that certain favorite or lucky racquets or accessories are included in the single, wide-compartmented bag. Thus, preparation time for travel to and from a tournament and the chance of arriving at a tournament without a needed racquet or accessory undesirably increases.

Even recreational or casual tennis players often carry more than one racquet to and from practice or a competitive match, e.g. a practice racquet and a competition-level racquet, along with an assortment of tennis attire and accessories. The player's racquet set conventionally is within the single wide compartment of a conventional tote bag and the individual racquets in the set are subject to unnecessary wear or damage. Moreover, sorting through a number of racquets and accessories to decide which ones to shove together into the conventional tote bag for a particular tennis outing is time consuming, and a missing or forgotten tennis racquet or piece of gear is frustrating.

SUMMARY OF THE INVENTION

The invented modular, capacity-adjustable racquet tote bag device includes two or more individual container segments each configured to contain at least a head portion of a racquet, each segment being substantially coextensive and congruent in dimension and shape on at least one face with another; cooperative fastening means extending circumferentially around confronting ones of the faces, the joining means configured to securely join the two or more individual container segments together; and tote means, e.g. a handle or shoulder strap, associated with at least one of the segments for transporting the racquet tote bag device. Preferably, the cooperative joining means includes one or more confronting loop and pile textile members configured to detachably affix to one another when pressed together. Coding means such as color coding, pattern coding, graphic coding and/or text coding can also be included for visually distinguishing and appointing the two or more container segments. One or more interior or exterior pockets configured to contain gear, e.g. spare racquet strings or cans of balls or fresh socks or wristbands or the like, can also be included in one or more of the two or more container segments.

BRIEF DESCRIPTION OF THE DRAWINGS

FIG. 3 is an isometric view corresponding to FIG. 3, but showing the single modular segment open to reveal its contents.

FIGS. 4A, 4B, 4C and 4D are fragmentary, cutaway isometric views of the racquet tote bag device, in accordance with alternative embodiments of the invention, respectively featuring loop and pile, zipper, snap and magnet fastening means.

FIG. 5 is a schematic, isometric view of the racquet tote bag device, in accordance with one embodiment of the invention, illustrating the possible signage, solid or patterned and color segmented coding means.

FIGS. 6A and 6B are schematic illustrations of the racquet tote bag device, in accordance with alternative embodiments of the invention, respectively featuring wheels and backpack tote means.

DETAILED DESCRIPTION OF THE PREFERRED EMBODIMENTS

The invention in accordance with one preferred embodiment involves a modular racquet tote bag configurable for carrying one or more racquets along with other accessories, the tote bag being configured in individual but joinable segments each individually capable of containing one or more tennis racquets and gear, e.g. accessories and/or attire, etc., and all when joined being capable in combination of containing plural racquets and accessories. Those of skill in the art will appreciate that, in striking contrast, conventional racquet tote bags are configured for carrying one or more racquets and one or more accessories all jumbled together in a tote bag of a singularly inflexible fixed configuration, size, shape, and color. Those of skill in the art will appreciate that tennis gear is used very broadly herein to include shoes, underwear, socks, shirts, braces, lip balm, sunscreen, grips, strings, hats, balls, headbands, wristbands, sweats, water, food, energy snacks or drinks, scorecards, personal digital assistants (PDAs), cell phones, etc.

Thus, the advantages of the invented device over conventional racquet tote bags include a) flexibility and modularity based upon how many and which ones of plural racquets and gear a user desires to carry to a particular tennis outing; b) quick and easy selecting and fastening of the individual bag segments together to accommodate the desired racquet-carrying and gear-carrying capacity; and c) choice of size, shape and color configuration due to the invented tote bag's segmented modularity.

Figure 1:
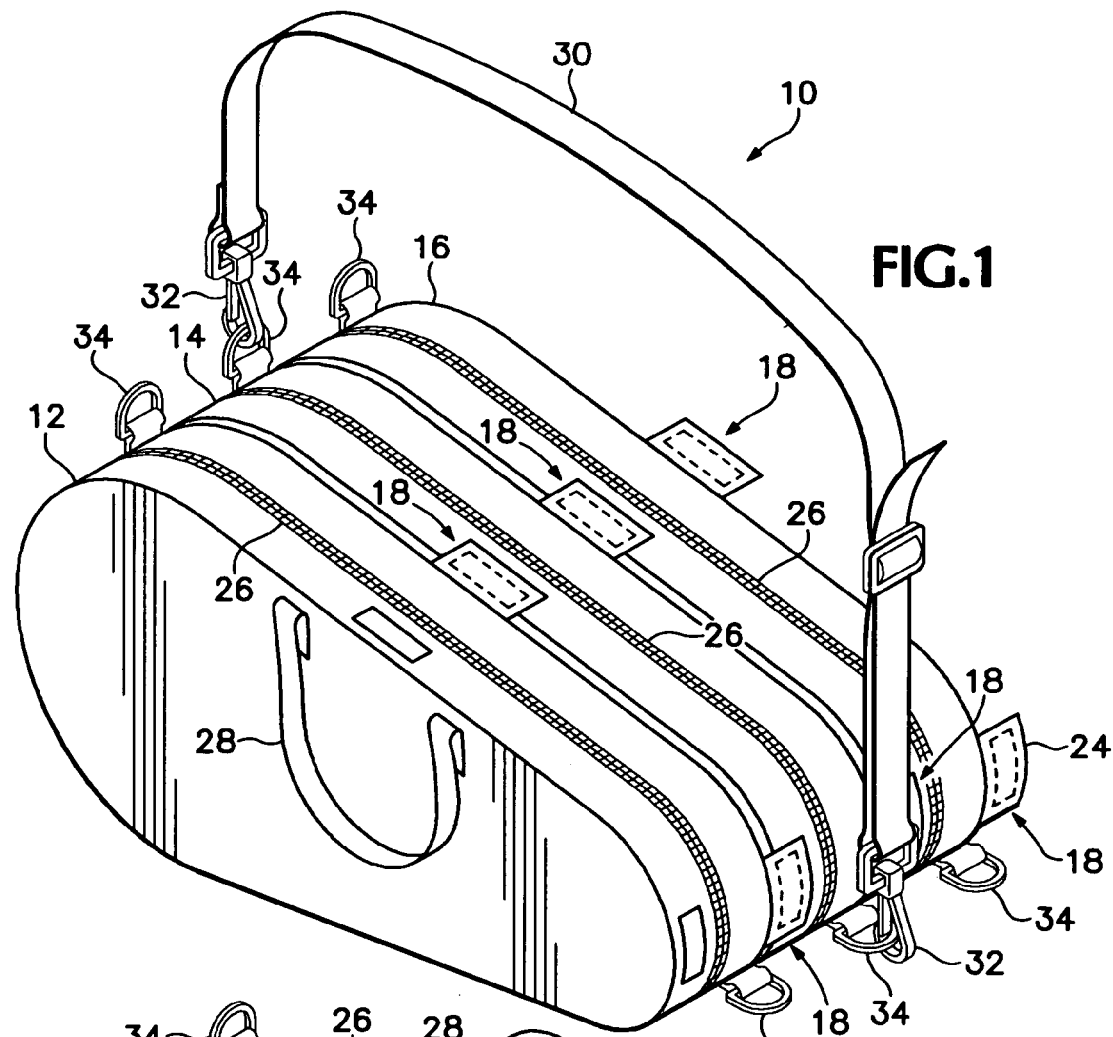
FIG. 1 is an isometric view of the invented plural-segment modular racquet tote bag device in accordance with one embodiment of the invention.
Figure 2:
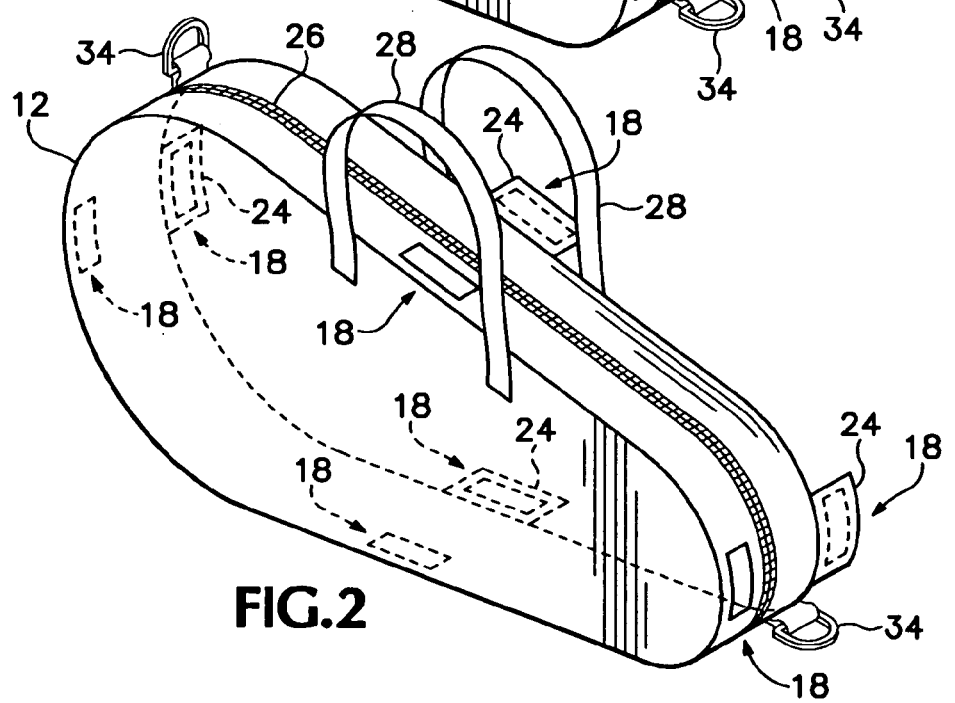
FIG. 2 is an isometric view of the racquet tote bag device according to the invention, illustrating a single one of the plural modular segments thereof in disassembled form.

FIGS. 1 and 2 collectively show in isometric view the invented modular racquet set tote bag device at 10. Device 10 includes plural, e.g. two or more and preferably three as shown, individual container segments 12, 14, 16 that are laterally stacked and securely joined together by cooperative fastening or affixing means 18. Fastening means or mechanism 18 may be seen in accordance with one embodiment of the invention to extend at least part-way and generally circumferentially around confronting ones of the faces of the two or more container segments. Each of the container segments 12, 14, 16 are configured, as will be seen by reference to FIG. 3, to contain at least a head portion of a racquet and associated gear. Each of the individual container segments is substantially coextensive and congruent in dimension and shape on at least one face with another, as illustrated in FIG. 1.

Fastening means or mechanism 18 is configured to securely join two or more individual container segments together. Preferably, fastening means 18 includes one or more confronting loop and pile textile members such as members 20a, 22a, commonly known Velcro®, configured to detachably affix to one another when pressed together. As will be understood from FIG. 2, fastening means 18 preferably include four pairs of loop and tile textile members (such as confronting textile members 20a, 22a of FIG. 4A) preferably approximately evenly spaced around the perimeter of each container segment such as segment 12. It will be appreciated from FIG. 1 and by brief reference to FIG. 4A that loop textile member 20a and pile textile member 20a are aligned with one another so that they are easily secured by pressing the two members together, e.g. by pressing tab 24 of container segment 12 against member 22a mounted near the peripheral edge of container segment 14.

Those of skill in the art will appreciate that each container segment such as segment 12 preferably includes an interior space defined between opposite sides of segment 12, the space being suitable for containing one or more racquets and associated gear, the interior space being secured preferably by a zipper 26. The container segments such as segment 12 within the spirit and scope of the invention may take different forms, may be differently shaped, may be differently dimensioned, and may be differently opened, closed and otherwise secured to enclose the one or more racquets and associated gear.

Those of skill in the art will appreciate that any number of individual container segments 12, 14, 16, etc. can be affixed together as described and illustrated herein. This is by virtue of the asymmetric uniformity of the design of the container segments including fastening or affixing means 18. Accordingly, while three such container segments are illustrated herein, any reasonable number of "modules" can be assembled into a tote bag device, in accordance with the teachings herein, whether more or less than three, depending upon the particular needs of the user for racquets and associated gear.

Device 10 further includes tote means that may take any suitable form such as that of one or more handles 28 or a (preferably adjustable-length) shoulder strap 30. It will be appreciated that handles 28 are made of flexible fabric that enables them to be employed as shown in FIG. 2 or to be stowed as shown in FIG. 1. In their stowed position, it will be appreciated that interior handles 28 between adjacent joined container segments such as segments 12, 14 and 14, 16 are hidden from view in FIG. 1 and are captured effortlessly between the container segments when the same are joined by fastening mean 18. Preferably, handles 28 are permanently affixed, e.g. sewn, near the top edges of opposite faces of each container segment, as indicated. Shoulder strap 30 is provided on either end with a hook 32, as may be seen in FIG. 1 to provide for its detachable securing to either end of center container segment 14. Advantageously, each container segment is provided on either end with a ring 34 compatible with the hook 32. In this manner, any chosen one of container segments 12, 14, 16 may be secured by shoulder strap 30.

In accordance with one embodiment of the invention, the container segments, the tabs that form a part of the fastening or affixing means and the tote means are made of woven nylon or canvas. Alternatively, but within the spirit and scope of the invention, they can be made of any suitable material that is durable, flexible and preferably lightweight, e.g. leather. If desired, and also within the spirit and scope of the invention, the sidewalls of the container segments can be starched or otherwise reinforced and stiffened by a thin, lightweight, planar expanse of, for example, plastic, cardboard or pressed board, that is inserted between double-walled material expanses.

Since each of container segments 12, 14, 16 is preferably identically structured, even if differently colored or textured, they are structurally interchangeable and can be positioned relative to one another by the user in any desired order. For this reason, each container segment is provided with one or more handles, fastening means and ring pairs to ensure their interchangeability and the ability of the center container segment, preferably, to be equipped with a shoulder strap for good balance when device 10 is transported. The desirability of being able to position, or laterally stack, the two or more individual container segments in any desired order will be better appreciated by reference to FIG. 5 below.

It will also be appreciated that, for heavier loads, the loop and pile textile members can be increased in number or enlarged to provide more surface area of engagement and thus more fastening power. For example, the four pairs of loop and pile textile members each can be extended lengthwise, or widened, to increase their fastening strength. Or the loop and pile textile members can be rendered in a contiguous, singular strip that extends all the way around the perimeters of each of the container segments. Such alternative numbering, sizing and placement of one or more loop and pile textile members are contemplated as being within the spirit and scope of the invention.

(FIG. 2 shows tabs 24 extending laterally from the edges of container segment 12. It will be appreciated by those of skill in the art that these tabs are used to secure another container segment to container segment 12. FIG. 1 shows a tab 24 extending laterally from a front edge of last container segment 16. It will be appreciated that the other two tabs are hidden from view in FIG. 1. It will be appreciated that, if desired to dress device 10 when it is configured for use, each of the tabs can, in accordance with the invention, be provided with an adjacent mating fastening means on the near face of the container segment so that if the tab is unused to fasten another bag it nevertheless can be neatly tucked away by simply folding it around the corner and pressing it against the mating fastening structure.)

FIG. 3 shows an individual container segment 12 open to illustrate the use of its interior space for secure racquet and/or gear containment. One or more racquets 40 (only two of which are shown in FIG. 3 for the sake of clarity) readily fit within the interior of the container segment, along with associated gear (of which a canister of tennis balls, a folded towel and a wet headband, in phantom, are deemed illustrative) as does one or more pockets 42, 44. Those of skill in the art will appreciate that pockets 42, 44 within the spirit and scope of the invention can assume any form, can be in any number, can be made of any material, and can be located anywhere within the interior or exterior of each container segment. In the illustrated embodiment of the invention, the pockets are made of woven or molded nylon and pocket 42 is preferably solid-walled whereas pocket 44 is preferably mesh-walled. The pockets or their openings can be elastic so as to increase their capacity for gear. Mesh pocket 44 is especially useful for wet clothing or accessories such as wristbands or headbands, since it breathes. The pockets can be equipped with snaps or other fasteners if it is desired to secure their contents.

Those of skill in the art will appreciate that individual container segments such as segment 12 illustrated in FIG. 3 can be shaped and dimensioned in any suitable manner, within the spirit and scope of the invention, to accommodate a wide range of uses for containing racquets and/or gear. For example, an individual container may be dedicated to containing only racquets, only gear or a combination of racquets and gear. Because of the modularity and easy stacking and fastening of plural individual containers together for transporting, in accordance with the invention, a great deal of flexibility and ease of use is provided. In accordance with one embodiment of the invention, each individual container segment is shaped generally as an oval (i.e. is tapered slightly from end to end) when viewed normal to its planar extent. Each is dimensioned in depth to accommodate 2-4 racquets (e.g. approximately 3-5 inches) and in length (e.g. approximately 24-36 inches) and height (e.g. approximately 12-18 inches) to accommodate the typical racquet dimensions, although within the spirit and scope of the invention each may be alternatively shaped and dimensioned.

FIGS. 4A-4D illustrate alternative embodiments of fastening or affixing means 18 as broadly involving the use of opposable mate-able or engage-able, i.e. interlock-able, fastener members extending at least part-way around confronting peripheral edges of at least interior faces of plural individual container segments.

Specifically, FIG. 4A illustrates the preferred loop and pile textile embodiment in which a loop strip 20a is provided on the inside of a tab 24 made to overlap and confront a pile strip 22a provided on a surface S of the peripheral edge of the individual container segment. FIG. 4B illustrates an alternative zipper embodiment featuring opposing zipper members 46a, 46b similarly configured on tab 24 and confronting surface S. FIG. 4C illustrates an alternative snap embodiment featuring opposing female and male snap components 48A, 48B similarly configured on tab 24 and confronting surface S. FIG. 4D illustrates an alternative magnet embodiment featuring oppositely polarized (e.g. north and south poles) magnetic members 50a, 50b similarly configured on tab 24 and confronting surface S.

Those of skill in the art will appreciate that the alternative fastening or affixing means and mechanisms contemplated as being within the spirit and scope of the invention can require or prefer different numbers or sizes of fastening members. For example, more than one snap per strip may be required or desired or more or longer strips may be required or desired. Or the snap members can take a different form, e.g. interlocking molded plastic parts that snap engage and press release. Similarly, more magnets may be required or desired or stronger strip magnets may be required or desired. Similarly, fewer, longer zippers, e.g. one or more zippers that collectively extend substantially entirely around the perimeter of the individual container segments may be required or desired.

Accordingly, those of skill in the art will appreciate that any suitable fastening or affixing means is contemplated as being within the spirit and scope of the invention. Accordingly, the invention is as broad as the appended claims and the particular fastening means are illustrative of such breadth.

FIG. 5 schematically illustrates what is referred to herein as coding means for visually distinguishing one or more of the individual container segments from one or more of the others. In FIG. 5, it will be appreciated that such different coding means such as color differentiation, pattern differentiation, graphic differentiation, text differentiation and fabric texture differentiation are illustrated schematically by lining. Thus, it will be appreciated that at least one exterior face of container segment 12 can be colored, printed, patterned, textured, etc. in a different way than is at least one exterior face of container segment 14. And that at least one exterior face of container segment 14 can be colored, printed, patterned, textured, etc. in a different way than is at least one exterior face of container segment 16. Such differences are indicated schematically in FIG. 5 by lining that is oriented at different angles on the near face of each container segment.

It will be appreciated that the coding means can extend around the entire exterior surfaces of one or more container segments, and that the coding means on one face of each container segment can be different from the coding means on another face of the same container segment. By coding opposite faces of the same container segment differently, either coded face can be exposed and made visible by simply moving the container segment from one end of the lateral stack to the other. By coding each container segment differently, the user can render the container segments readily visually distinguishable for identification of contents purposes. Using color coding as but one of many coding examples, tournament racquets can always be placed in a blue container segment, while tournament gear can always be placed in a white container segment. Or business gear, e.g. a scorecard, a PDA or a cell phone, can always be placed in a green container segment. Such visual coding is extremely useful as a time saver, for example, for the busy tennis player.

It also will be appreciated that the coding means can be useful for purposes other than visual identification by the user. For example, color or texture coding can be used as a simple aesthetic, representing, for example, the user's favorite colors or textures. Or color combinations can represent the colors of the country that the user represents in worldwide tournament play. Or the user can make a personal statement by way of text on one or more of the visible faces of the individual container segments. Or the user can place graphics such as sponsorship logos or branding on the exterior faces of device 10. Thus, highly visible brand recognition and/or personal statements can be made by the user to wide audiences including tournament or television spectators. Alternative coding means are contemplated as being within the spirit and scope of the invention.

FIGS. 6A and 6B show alternative tote means that are contemplated as being within the spirit and scope of the invention. Those of skill in the art will appreciate that FIGS. 6A and 6B show tote bag device 10 in only simplified, schematic, outline form. It will be appreciated that the depicted tote bags nevertheless are structured generally as described and illustrated herein.

Specifically, FIG. 6A illustrates in a simplified side elevation alternative tote means 52 including a base 54 providing one or more wheels 56 and a stabilizing strut 58, a tow or pull handle 60 and any suitable means 62 for securing device 10 thereto, if needed. Those of skill in the art also will appreciate that securing means 62 can involve the use of snaps, magnets, rings, hooks, straps, zippers, Velcro® or other fasteners in any suitable combination, in accordance with the teachings herein regarding fastening or affixing means 18, handles 28 and/or shoulder strap 30. Those of skill in the art also will appreciate that device 10 alternatively can be permanently secured to tote means 52. Those of skill in the art will appreciate that tote means 52 enables the user to tug device 10 behind him or her through an airport, for example, with the mechanical advantages of weight borne by the walking surface and rolling friction only.

Specifically, FIG. 6B illustrates in a simplified side elevation alternative tote means 64 including a back-pack-styled strap or pair of straps 66 having a corresponding shock-absorbing pad or pads 68 to soften the burden of carrying in the user's load-bearing shoulder region. Those of skill in the art will appreciate that alternative tote means 64 can also include any suitable means 70 for securing device 10 thereto, as described above in relation to tote means 52.

It will be understood that the present invention is not limited to the method or detail of construction, fabrication, material, application or use described and illustrated herein. Indeed, any suitable variation of fabrication, use, fastening means, or application is contemplated as an alternative embodiment, and thus is within the spirit and scope, of the invention.

From the foregoing, those of skill in the art will appreciate that several advantages of the present invention include the following.

The present invention provides freedom of choice in how many and which ones of plural racquets and which gear and how much gear (clothes, equipment, accessories, etc.) are accommodated by the tote bag and variable size, shape and color in the joined, modular segments. It also provides ease of configuration of the tote bag for a particular practice, travel or tournament outing. The modular racquet tote bag can be quickly and easily assembled, disassembled and reconfigured to meet the user's varying needs. Yet it provides secure containment of one or more racquets and a variety of gear in one or more modular, individual, racquet-containing segments that are durably joined into a tote bag easily carried by hand, wheeled, slung over a shoulder or worn as a backpack.

It is further intended that any other embodiments of the present invention that result from any changes in application or method of use or operation, method of manufacture, shape, size, or material which are not specified within the detailed written description or illustrations contained herein yet are considered apparent or obvious to one skilled in the art are within the scope of the present invention.

Accordingly, while the present invention has been shown and described with reference to the foregoing embodiments of the invented device, it will be apparent to those skilled in the art that other changes in form and detail may be made therein without departing from the spirit and scope of the invention as defined in the appended claims.

I claim:

1. A modular, capacity-adjustable racquet and gear tote bag device comprising:
    two or more individual container segments each configured to contain at least a head portion of a racquet and associated gear, each of said two or more individual container segments being substantially coextensive and congruent in dimension and shape on at least one face with another of said two or more individual container segments;
    a plurality of manually detachable cooperative fastening means arranged at least part-way and generally circumferentially around confronting ones of said faces of the two or more container segments, the fastening means securely joining the two or more individual container segments together, at least two of said individual container segments so joined each including additional plural fastening means configured to similarly allow the joining of at least one additional container segment;
    a mating fastening structure proximate to at least a first of the additional fastening means, the mating fastening structure configured to mate with and retain the first additional fastening means in a non-extended position when the first additional fastening means is deflected toward and fixed to the mating fastening structure;
    tote means associated with at least one of the two or more individual container segments for transporting the racquet tote bag device; and
    said two or more individual container segments and said fastening means collectively configured to permit plural-racquet and plural-gear capacity adjustment of said tote bag.

2. The device of claim 1, wherein said cooperative fastening means includes one or more confronting loop and pile textile members configured to detachably affix to one another when pressed together.

3. The device of claim 2, wherein for each of said one or more confronting loop and pile textile members, one of said loop and tile textile members is fixed along a perimeter of one of the confronting faces and the other of said loop and tile textile members is fixed along an inside of a flap that extends from the other of the confronting faces, said flap configured to overlap said perimeter of said one of the confronting faces.

4. The device of claim 1, wherein said tote means includes a handle.

5. The device of claim 4, wherein said tote means further includes one or more wheels.

6. The device of claim 1, wherein said tote means includes a shoulder strap.

7. The device of claim 1 which further comprises:
    one or more pockets configured to contain gear, said one or more pockets positioned within or outside one or more of said two or more individual container segments.

8. The device of claim 1, wherein one or more of said two or more container segments is differently colored, patterned, printed or textured to be visually distinguishable from one or more others of said two or more container segments.

9. The device of claim 1, wherein said two or more container segments number three or more, and wherein at least a first interior one of said three or more container segments includes a portion of such cooperative fastening means arranged at least part-way around the periphery of either face thereof such that the other at least two of said three or more container segments can be fastened on either side of said first interior container segment.

10. The device of claim 9 which further comprises:
    coding means for visually distinguishing at least one of said three or more container segments from at least another of the two or more container segments, said coding means involving one or more of color differentiation, pattern differentiation, graphic differentiation, text differentiation and fabric texture differentiation.

11. The device of claim 1, wherein each of the two or more individual container segments includes at least one attachment member on each of at least two opposing ends of the container segment, said attachment members each configured to securely and detachably receive a reciprocal attachment member of a shoulder strap.

12. The device of claim 1, wherein the fastening means of each of said individual container segments include at least two parts, a first part of which resides along a periphery of the container segment on a first side thereof and a second part of which resides along a periphery of the container segment on a second side thereof, said two parts of said fastening means including opposable fastener members, the first part of the fastening means of each container segment being align-able and fasten-able to the second part of the fastening means of an adjacent container segment.

13. The device of claim 1, wherein at least one of the cooperating fastening means includes one or more fasteners chosen from the group including a loop-and-pile texture, a snap, a zipper and a magnet.

14. A modular racquet and gear tote bag comprising:
two or more separable racquet-and-gear container segments configured to be joined together to form an integral container device capable of containing a racquet and associated gear;
a manually detachable fastening mechanism arranged at least part-way around confronting peripheral edges of at least adjacent faces of said container segments, said fastening mechanism including confronting pairs of opposing fasteners including one or more of a loop and pile texture, a snap, a zipper and a magnet;
a plurality of additional manually detachable fastening mechanisms arranged at least part-way around non-adjacent faces of said container segments, each of a subset of the additional fastening mechanisms capable of being retained in a folded position by a reciprocal mating fastening structure affixed proximate to and upon a same container segment as the additional fastening structure;
a tote mechanism for transporting said integral container, said tote mechanism including one or more of a handle, a shoulder strap and a wheel; and a coding mechanism for visually differentiating at least one of said two or more separable racquet container segments from the other one or more separable racquet-and-gear container segments, said coding mechanism involving one or more of color differentiation, pattern differentiation, graphic differentiation, text differentiation and fabric texture differentiation.

* * * * *